(12) United States Patent
 Hamada

(10) Patent No.: US 12,651,039 B2
(45) Date of Patent: Jun. 9, 2026

(54) APPROXIMATE FUNCTION CALCULATION APPARATUS, METHOD AND PROGRAM

(71) Applicant: NTT, Inc., Tokyo (JP)

(72) Inventor: Koki Hamada, Musashino (JP)

(73) Assignee: NTT, Inc., Tokyo (JP)

( * ) Notice: Subject to any disclaimer, the term of this patent is extended or adjusted under 35 U.S.C. 154(b) by 1101 days.

(21) Appl. No.: 17/762,740

(22) PCT Filed: Oct. 10, 2019

(86) PCT No.: PCT/JP2019/039989
§ 371 (c)(1),
(2) Date: Mar. 23, 2022

(87) PCT Pub. No.: WO2021/070317
PCT Pub. Date: Apr. 15, 2021

(65) Prior Publication Data
US 2022/0335104 A1     Oct. 20, 2022

(51) Int. Cl.
*G06F 17/17* (2006.01)

(52) U.S. Cl.
CPC .................................... *G06F 17/17* (2013.01)

(58) Field of Classification Search
CPC ... G06F 17/17; G06F 7/544; G06F 7/548–556
See application file for complete search history.

(56) References Cited

U.S. PATENT DOCUMENTS 10,740,432 B1 * 8/2020 Diamant ................ G06N 3/045

FOREIGN PATENT DOCUMENTS

EP 2645199 A1 10/2013
JP 2013-025467 A 2/2013

OTHER PUBLICATIONS

Keigo et al, "Approximation Operation Circuit for Logarithmic Function" is a Machine translation of JP 2013025467 A (Year: 2013).*

Mishina et al., "Designs and Implementations of Efficient and Accurate Secret Logistic Regression", Computer Security Symposium, Oct. 22-25, 2018, pp. 1229-1236 (17 pages including English Translation).

* cited by examiner

*Primary Examiner* — Carlo Waje
(74) *Attorney, Agent, or Firm* — XSENSUS LLP

(57) ABSTRACT

An approximate function calculation apparatus includes: a first error upper bound calculating unit which obtains an upper bound of a first error of an approximation of a function $f(x)$ by the function $g_b(x)$ in a section $[x_0, b]$; an expansion position calculating unit which obtains an expansion position b' that represents a maximum b at which the upper bound of the first error; a second error upper bound calculating unit which obtains an upper bound of a second error of an approximation of the function $f(x)$ by a function $g_b'(x)$ in a section $[b', x_2]$; a right end position calculating unit which calculates a right end position $x_2'$ that represents a maximum $x_2$ at which the upper bound of the second error; and a control unit which repeats processing of the respective units with a section $[x_2', x_1]$ as the section D.

5 Claims, 3 Drawing Sheets

START

S1 PERFORM TAYLOR EXPANSION

S2 CALCULATE UPPER BOUND OF ERROR

S3 CALCULATE EXPANSION POSITION

S4 CALCULATE UPPER BOUND OF ERROR

S5 CALCULATE RIGHT END POSITION

S6 OUTPUT SECTION $[x_0, x_2']$ and $g$ AT $b'$

S7 CONTROL REPEAT

END

APPROXIMATE FUNCTION CALCULATION APPARATUS, METHOD AND PROGRAM

CROSS-REFERENCE TO RELATED APPLICATION

The present application is based on PCT filing PCT/JP2019/039989, filed Oct. 10, 2019, the entire contents of which are incorporated herein by reference.

TECHNICAL FIELD

The present invention is related to a method of creating an approximate function for each section for performing an approximation of a function.

BACKGROUND ART

As a method of obtaining a specific calculation result without restoring an encrypted numerical value, there is a method called secure computation. In a method according to NPL 1, by performing encryption involving distributing pieces of a numerical value to three secure computation apparatuses and having the three secure computation apparatuses perform cooperative computing, results of addition and subtraction, constant addition, multiplication, constant multiplication, logical operations (negation, conjunction, disjunction, and exclusive disjunction), and data format conversion (integers and binary numbers) can be held while being distributed to the three secure computation apparatuses or, in other words, while being encrypted.

When calculating many complex function values with secure computation, there is a method involving approximating a function on a per-section basis with a polynomial of which a degree is determined in advance using a reference table according to a method referred to as batch mapping, obtaining each coefficient of the polynomial having been approximated using batch mapping, and obtaining an approximation by a calculation using a polynomial determined by the respective obtained coefficients. For more information on batch mapping, refer to NPL 1.

CITATION LIST

Non Patent Literature

[NPL 1] Ibuki Mishina, Dai Ikarashi, Koki Hamada, Ryo Kikuchi, "Designs and Implementations of Efficient and Accurate Secret Logistic Regression", In CSS, 2018.

SUMMARY OF THE INVENTION

Technical Problem

However, with conventional methods, it is sometimes necessary to reduce a width of a section in order to perform approximation with a desired error when a parameter contains error such as when using a fixed-point number. Therefore, there are a large number of sections that cover an entire domain.

An object of the present invention is to provide an approximate function calculation apparatus, method, and program which realize an approximation of each section of an entire domain with a smaller number of sections as was conventional.

Means for Solving the Problem

An approximate function calculation apparatus related to a method according to an aspect of the present invention includes, when $x_0$ and $x_1$ represent predetermined numbers satisfying a relationship expressed as $x_0 < x_1$, $D=[x_0, x_1]$ represents a section in which a function $f(x)$ is to be approximated, $\varepsilon$ represents a predetermined number that is an error allowed in approximation, k represents a predetermined integer equal to or larger than 0, b represents a number satisfying a relationship expressed as $x_0 < b < x_1$, and a function $g_b(x)$ represents a Taylor expansion of the function $f(x)$ up to a k-th degree at b: a Taylor expansion unit which obtains the function $g_b(x)$; a first error upper bound calculating unit which obtains an upper bound of an error of an approximation of the function $f(x)$ by the function $g_b(x)$ in a section $[x_0, b]$; an expansion position calculating unit which obtains an expansion position b' that represents a maximum b at which the upper bound of the error of an approximation of the function $f(x)$ by the function $g_b(x)$ in the section $[x_0, b]$ is equal to or smaller than e using the upper bound of error obtained by processing by the first error upper bound calculating unit; a second error upper bound calculating unit which obtains an upper bound of an error of an approximation of the function $f(x)$ by a function $g_b'(x)$ in a section $[b', x_2]$, where $x_2$ represents a number satisfying $b' < x_2 \leq x_1$; a right end position calculating unit which calculates a right end position $x_2'$ that represents a maximum $x_2$ at which the upper bound of the error of an approximation of the function $f(x)$ by the function $g_b'$ in the section $[b', x_2]$ is equal to or smaller than e using the upper bound of error obtained by processing by the second error upper bound calculating unit; an output unit which outputs information related to a section $[x_0, x_2']$ and the function $g_b'(x)$; and a control unit which repeats processing of the Taylor expansion unit, the error upper bound calculating units, the expansion position calculating unit, the right end position calculating unit, and the output unit with a section $[x_2', x_1]$ as the section D.

Effects of the Invention

Choosing a function to be approximated well enables an error of an output to be reduced even when a parameter contains an error and enables approximation of each section of an entire domain to be realized with a small number of sections.

DESCRIPTION OF EMBODIMENTS

Figure 1:
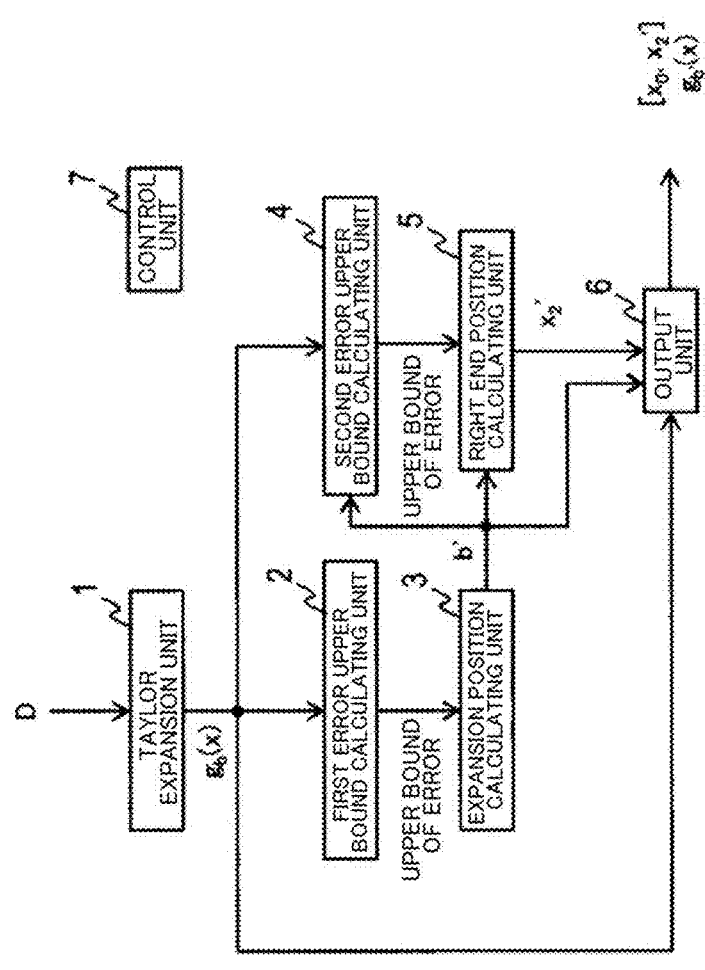
FIG. 1 is a diagram showing an example of a functional configuration of an approximate function calculation apparatus.

An embodiment of the present invention will be described in detail below. It should be noted that a constituent unit having a same function in the drawings will be denoted by a same numeral and a redundant description will be omitted.

Approximate Function Calculation Apparatus and Method

As shown in FIG. 1, for example, an approximate function calculation apparatus is provided with a Taylor expansion unit 1, a first error upper bound calculating unit 2, an expansion position calculating unit 3, a second error upper bound calculating unit 4, a right end position calculating unit 5, an output unit 6, and a control unit 7.

Figure 2:
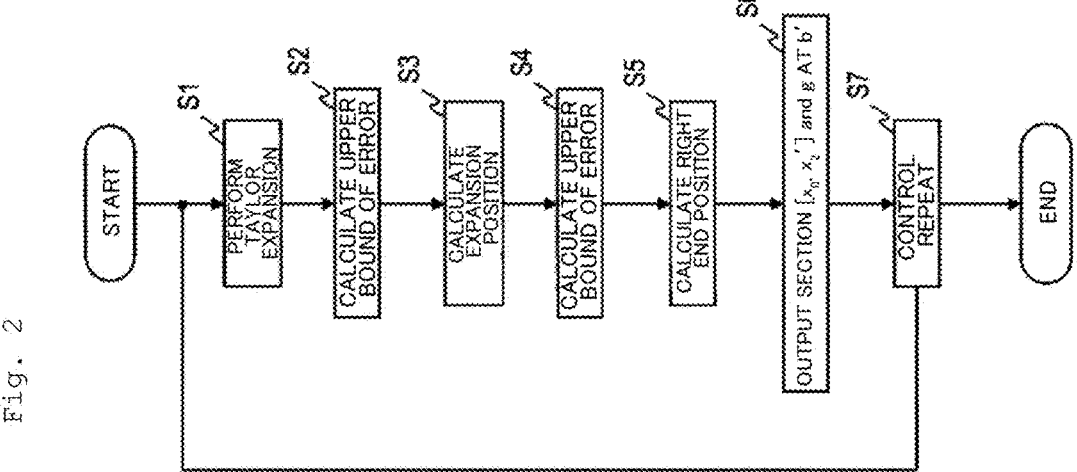
FIG. 2 is a diagram showing an example of processing procedures of an approximate function calculation method.

For example, an approximate function calculation method is realized as the respective constituent units of the approximate function calculation apparatus perform processing of step S1 to step S7 described below and shown in FIG. 2.

Hereinafter, each constituent unit of the approximate function calculation apparatus will be described.

Taylor Expansion Unit 1

Information on a section $D=[x_0, x_1]$ is input to the Taylor expansion unit 1. The section D is a section in which a function f(x) is to be approximated. $x_0$ and $x_1$ represent predetermined numbers that satisfy a relationship expressed as $x_0 < x_1$. As will be described later, the section D is updated by the control unit 7.

The Taylor expansion unit 1 obtains a function $g_b(x)$ (step S1).

The obtained function $g_b(x)$ is output to the first error upper bound calculating unit 2 and the second error upper bound calculating unit 4. In addition, a function $g_b'(x)$ that corresponds to an expansion position b' obtained by the expansion position calculating unit 3 to be described later is output to the output unit 6.

k represents a predetermined integer equal to or larger than 0, b represents a number satisfying a relationship expressed as $x_0 < b < x_1$, and the function $g_b(x)$ represents a Taylor expansion of the function f(x) up to a k-th degree at b.

For example, the function $g_b(x)$ is represented by the following expressions, where $f^{(i)}$ represents a function obtained by differentiating a function f i-number of times.

$$g_b(x)=a_0+a_1(x-b)+\ldots+a_k(x-b)^k a_i=f^{(i)}(a)/i!$$

First Error Upper Bound Calculating Unit 2

The function $g_b(x)$ obtained by the Taylor expansion unit 1 is input to the first error upper bound calculating unit 2.

The first error upper bound calculating unit 2 obtains an upper bound of an error of approximation of the function f(x) by the function $g_b(x)$ in a section $[x_0, b]$ (step S2). In this case, an "upper bound of an error" more specifically refers to an "upper bound of an absolute value of an error".

The obtained upper bound of the error is output to the expansion position calculating unit 3.

For example, let positions at predetermined intervals in the section $[x_0, b]$ be represented by c0, c1, . . . , cM. In this case, the first error upper bound calculating unit 2 obtains $ei=max_{i=1, 2, \ldots, M}|f(ci)-g_b(ci)|$, and adopts ei as the upper bound of the error of approximation of the function f(x) by the function $g_b(x)$ in a section $[x_0, b]$.

Expansion Position Calculating Unit 3

The upper bound of the error obtained by the first error upper bound calculating unit 2 is input to the expansion position calculating unit 3.

Using the upper bound of the error obtained by processing by the first error upper bound calculating unit 2, the expansion position calculating unit 3 obtains an expansion position b' that represents a maximum b at which the upper bound of the error of an approximation of the function f(x) by the function $g_b(x)$ in the section $[x_0, b]$ is equal to or smaller than ε (step S3).

The obtained expansion position b' is output to the second error upper bound calculating unit 4, the right end position calculating unit 5, and the output unit 6.

For example, let us assume that the Taylor expansion unit 1 obtains functions $g_{b0}(x)$, $g_{b1}(x)$, . . . , $g_{bN}(x)$ that correspond to b0, b1, . . . , bN at predetermined intervals in the section D. Let us also assume that $b0 < b1 < \ldots < bN$. In this case, in the first error upper bound calculating unit 2, an upper bound ei of the error of approximation of the function f(x) by a function $g_{bi}(x)$ in a section $[x_0, b_i]$ is obtained, where i=1, 2, . . . , N. In this case, the expansion position calculating unit 3 obtains maximum i that satisfies $ei \leq \varepsilon$. In this case, bi corresponding to the maximum i represents the expansion position b'.

Alternatively, the expansion position calculating unit 3 may obtain the expansion position b' by a binary search method.

Second Error Upper Bound Calculating Unit 4

The expansion position b' obtained by the expansion position calculating unit 3 is input to the second error upper bound calculating unit 4.

The second error upper bound calculating unit 4 obtains an upper bound of an error of approximation of the function f(x) by a function $g_b'(x)$ in a section $[b', x_2]$, where $x_2$ represents a number satisfying $b' < x_2 \leq x_1$ (step S4).

The obtained upper bound of the error is output to the right end position calculating unit 5.

For example, let positions at predetermined intervals in the section $[b', x_2]$ be represented by d0, d1, . . . , dM. In this case, the second first error upper bound calculating unit 4 obtains $ei=max_{i=1,2,M}|f(di)-g_b'(di)|$, and adopts ei as the upper bound of the error of approximation of the function f(x) by the function $g_b'(x)$ in the section $[b', x_2]$.

Right End Position Calculating Unit 5

The upper bound of the error obtained by the second error upper bound calculating unit 4 is input to the right end position calculating unit 5.

Using the upper bound of the error obtained by processing by the second error upper bound calculating unit 4, the right end position calculating unit 5 obtains a right end position $x_2'$ that represents a maximum $x_2$ at which the upper bound of the error of an approximation of the function f(x) by the function $g_b'$ in the section $[b', x_2]$ is equal to or smaller than a (step S5).

The obtained right end position $x_2'$ is output to the output unit 6.

For example, let positions at predetermined intervals in the section $[b', x_2]$ be represented by r0, r1, . . . , rN. Let us also assume that $r0 < r1 < \ldots < rN$. In this case, in the second error upper bound calculating unit 4, an upper bound ei of an error of approximation of the function f(x) by the function $g_b'(x)$ in the section $[b', x_2]$ is obtained, where i=1, 2, . . . , N. In this case, the right end position calculating unit 5 obtains maximum i that satisfies $ei \leq \varepsilon$. In this case, ri corresponding to the maximum i represents the right end position $x_2'$.

Alternatively, the right end position calculating unit 5 may obtain the right end position $x_2'$ by a binary search method.

Output Unit 6

The expansion position b' obtained by the expansion position calculating unit 3 and the right end position $x_2'$ obtained by the right end position calculating unit 5 are input to the output unit 6. In addition, the function $g_b$'(x) corresponding to the expansion position b' is input to the output unit 6 from the Taylor expansion unit 1.

The output unit 6 outputs information related to a section $[x_0, x_2']$ and the function $g_b$'(x) (step S6).

Control Unit 7

The control unit 7 repeats processing of the Taylor expansion unit 1, the first error upper bound calculating unit 2, the expansion position calculating unit 3, the second error upper bound calculating unit 4, the right end position calculating unit 5, and the output unit 6 with a section $[x_2', x_1]$ as a section D (step S7). The processing is performed as long as $x_2' \neq x_1$ is satisfied. When $x_2' = x_1$, the control unit 7 ends processing.

In other words, when $x_2' \neq x_1$, the control unit 7 updates the section D to $[x_2', x_1]$ and once again performs processing of step S1 and thereafter. The control unit 7 ends processing when $x_2' = x_1$.

When performing an approximation of the section $[x_0, x_1]$ and the approximation is performed using a polynomial according to a conventional method, while a term of $|\Delta_k|$ $|x*|^k$ appears in an expression of the upper bound of the error due to truncation with respect to a given $x* \in [x_0, x_1]$ according to the embodiment described above, this term can be expressed as $|\Delta_k| w^k$. For example, since w is $x_1 - x_0$ at the most even when $|x*|$ is large such as when $x=10^6$, an error with respect to a same section width can be significantly reduced according to the embodiment described above.

With conventional methods, since approximation is performed using a polynomial of x, an error of a coefficient of $x^k$ is enlarged by a factor of approximately $|x_0|^k$ in a section where x increases. In contrast, by appropriately adopting $a_1$ as in the embodiment described above, the enlargement of the error of the coefficient can be kept to a factor of approximately $(x_1 - x_0)^k$. Therefore, even with respect to a section separated by a distance from an origin which conventionally had to be set narrow in order to achieve a desired error, a section with a large width can be set and a reduction in the number of sections can be realized.

Modification

If an upper bound of an absolute value of a residual term corresponding to Taylor expansion is represented by $\varepsilon_1$, an upper bound of an error of $a_j$ is represented by $\Delta_j$, an upper bound of an error of b is represented by $\Delta*$, R represents a predetermined section and w satisfies $w = \max_{x \in P} |x-b|$, and $\varepsilon_2$ is defined by the following expression $$\varepsilon_2 = ((|a_0|+\Delta_0)+(|a_1|+\Delta_1)(w+\Delta*)+ \ldots +(|a_k|+\Delta_k)(w+\Delta*)^k)-(|a_0|+|a_1|w+ \ldots +|a_k|w^k),$$

then the first error upper bound calculating unit 2 may adopt $\varepsilon_1 + \varepsilon_2$ when a section $[x_0, b]$ is adopted as the predetermined section R as the upper bound of an error of approximation of the function f(x) by the function $g_b(x)$ in the section $[x_0, b]$.

When a maximum value in the section R of $|f^{(k+1)}(x)|$ is represented by M, for example, the upper bound $\varepsilon_1$ of the absolute value of a residual term corresponding to Taylor expansion can be obtained by the following expression.

$$\varepsilon_1 = M \frac{|x-b|^{k+1}}{(k+1)!}$$ [Math. 1]

Specifically, $\Delta_j$ represents an upper bound of a truncation error of $a_j$ and $\Delta*$ represents an upper bound of a truncation error of b.

In a similar manner, the second error upper bound calculating unit 4 may adopt $\varepsilon_1 + \varepsilon_2$ when a section $[b', x_2]$ is adopted as the predetermined section R as the upper bound of an error of approximation of the function f(x) by the function $g_b$'(x) in the section $[b', x_2]$.

The expansion position calculating unit 3 may output information on a position b that corresponds to an upper bound of an error that is necessary for obtaining the expansion position b' to the first error upper bound calculating unit 2. In this case, after receiving the information on the position b that corresponds to the upper bound of the error, the first error upper bound calculating unit 2 may obtain the upper bound of the error that corresponds to the position.

In addition, the first error upper bound calculating unit 2 may output information on the position b for which an upper bound of an error is to be obtained to the Taylor expansion unit 1. In this case, after receiving the information on the position b for which the upper bound of the error is to be obtained from the first error upper bound calculating unit 2, the Taylor expansion unit 1 may obtain the function $g_b(x)$ that corresponds to the position b.

While an embodiment of the present invention has been described above, specific configurations are not limited to the embodiment and it is needless to say that the present invention also includes appropriate modifications in design or the like having been made without departing from the spirit and the scope of the invention.

The various processing steps explained in the embodiment may not only be executed in chronological order according to the described sequences but may also be executed in parallel or on an individual basis in accordance with processing capabilities of an apparatus to be used to execute the processing steps or as may be necessary.

For example, exchange of data between constituent units of the approximate function calculation apparatus may be performed either directly or via a storage unit (not illustrated).

Program and Recording Medium

Figure 3:
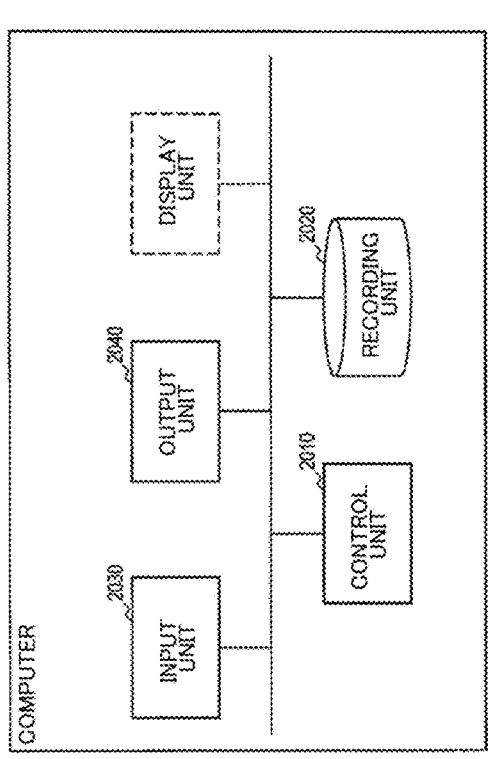
FIG. 3 is a diagram showing an example of a functional configuration of a computer.

When realizing the various processing functions in the various apparatuses described above with a computer, processing contents of functions which each apparatus must be equipped with are described by a program. In addition, the various processing functions in the various apparatuses described above are realized on the computer by having the computer execute the program. For example, the various processing steps described above can be performed by having a recording unit 2020 of a computer shown in FIG. 3 read a program to be executed and cause a control unit 2010, an input unit 2030, an output unit 2040, and the like to perform operations.

The program describing the processing contents can be recorded in a computer-readable recording medium. Any computer-readable recording medium may be used such as a magnetic recording apparatus, an optical disk, a magneto-optical recording medium, and a semiconductor memory.

In addition, the program is distributed by, for example, selling, transferring, or lending a portable recording medium such as a DVD or a CD-ROM on which the program is recorded. Furthermore, a configuration may be adopted in which the program is stored in a storage apparatus of a server computer and the server computer transmits the program to other computers via network in order to distribute the program.

For example, a computer that executes such a program first temporarily stores the program recorded in a portable recording medium or the program transmitted from a server computer in its own storage apparatus. In addition, when executing processing, the computer reads the program stored in its own storage apparatus and executes processing in accordance with the read program. Furthermore, as an alternative execution mode of the program, a computer may read a program directly from a portable recording medium and execute processing in accordance with the program or, every time the program is transmitted from a server computer to the computer, the computer may sequentially execute processing in accordance with the received program. In addition, a configuration may be adopted in which a program is not transmitted to the computer from a server computer but the processing described above is executed by a so-called ASP (Application Service Provider) type service which realizes a processing function only by issuing an execution instruction and acquiring a result thereof. It should be noted that the program according to the present mode includes information which is to be processed by an electronic computer and which is equivalent to a program (data or the like which is not a direct command intended for a computer but which has a property of specifying processing by the computer).

In addition, in the mode, while the present apparatus is configured by having a computer execute a prescribed program, at least a part of processing contents thereof may be realized by hardware.

The invention claimed is:

1. An approximate function calculation apparatus, comprising:

when $x_0$ and $x_1$ represent predetermined numbers satisfying a relationship expressed as $x_0 < x_1$, $D=[x_0, x_1]$ represents a section in which a function f(x) is to be approximated, $\varepsilon$ represents a predetermined number that is an error allowed in approximation, k represents a predetermined integer equal to or larger than 0, b represents a number satisfying a relationship expressed as $x_0 < b < x_1$, and a function $g_b(x)$ represents a Taylor expansion of the function f(x) up to a k-th degree at b:

Taylor expansion circuitry configured to obtain the function $g_b(x)$;

first error upper bound calculating circuitry configured to receive the function $g_b(x)$ from the Taylor expansion circuitry and obtain an upper bound of an error of an approximation of the function f(x) by the function $g_b(x)$ in a section $[x_0, b]$;

expansion position calculating circuitry configured to obtain an expansion position b' that represents a maximum b at which the upper bound of the error of the approximation of the function f(x) by the function $g_b(x)$ in the section $[x_0, b]$ is equal to or smaller than $\varepsilon$ using the upper bound of the error of the approximation of the function f(x) by the function $g_b(x)$ in the section $[x_0, b]$;

second error upper bound calculating circuitry configured to receive the function $g_b(x)$ from the Taylor expansion circuitry and obtain an upper bound of an error of an approximation of the function f(x) by a function $g_b'(x)$ in a section $[b', x_2]$, where $x_2$ represents a number satisfying $b' < x_2 \le x_1$;

right end position calculating circuitry configured to calculate a right end position $x_2'$ that represents a maximum $x_2$ at which the upper bound of the error of the approximation of the function f(x) by the function $g_b'(x)$ in the section $[b', x_2]$ is equal to or smaller than $\varepsilon$ using the upper bound of the error of the approximation of the function f(x) by the function $g_b'(x)$ in the section $[b', x_2]$;

output circuitry configured to output information related to a section $[x_0, x_2']$ and the function $g_b'(x)$; and control circuitry configured to repeat processing of the Taylor expansion circuitry, the first error upper bound calculating circuitry, the second error upper bound calculating circuitry, the expansion position calculating circuitry, the right end position calculating circuitry, and the output circuitry with a section $[x_2', x_1]$ as the section D.

2. The approximate function calculation apparatus according to claim 1, wherein when the function $g_b(x)$ is represented by the following expression $$g_b(x)=a_0+a_1(x-b)+ \ldots +a_k(x-b)^k$$

$a_i=f^{(i)}(a)/i!$, where $f^{(i)}$ represents a function obtained by differentiating a function fi-number of times, an upper bound of an absolute value of a residual term corresponding to the Taylor expansion is represented by $\varepsilon_1$, an upper bound of an error of $a_j$ is represented by $\Delta_j$, an upper bound of an error of b is represented by $\Delta^*$, R represents a predetermined section and w satisfies $w=\max_{x \in R}|x-b|$, and $\varepsilon_2$ is defined by the following expression $$\varepsilon_2=((|a_0|+\Delta_0)+(|a_1|+\Delta_1)(w+\Delta^*)+ \ldots +(|a_k|+\Delta_k)(w+\Delta^*)^k)-(|a_0|+|a_1|w+ \ldots +|a_k|w^k).$$

the first error upper bound calculating circuitry adopts $\varepsilon_1+\varepsilon_2$ when the section $[x_0, b]$ is adopted as the predetermined section R as the upper bound of the error, and the second error upper bound calculating circuitry adopts $\varepsilon_1+\varepsilon_2$ when the section $[b', x_2]$ is adopted as the predetermined section R as the upper bound of the error.

3. The approximate function calculation apparatus according to claim 1, wherein when the function $g_b(x)$ is represented by the following expression $$g_b(x)=a_0+a_1(x-b)+ \ldots +a_k(x-b)^k$$

$a_i=f^{(i)}(a)/i!$, where $f^{(i)}$ represents a function obtained by differentiating a function fi-number of times, an upper bound of an absolute value of a residual term corresponding to the Taylor expansion is represented by $\varepsilon_1$, an upper bound of an error of $a_j$ is represented by $\Delta_j$, an upper bound of an error of b is represented by $\Delta^*$, R represents a predetermined section and w satisfies $w=\max_{x \in R}|x-b|$, and $\varepsilon_2$ is defined by the following expression $$\varepsilon_2=((|a_0|+\Delta_0)+(|a_1|+\Delta_1)(w+\Delta^*)+ \ldots +(|a_k|+\Delta_k)(w+\Delta^*)^k)-(|a_0|+|a_1|w+ \ldots +|a_k|w^k),$$

the first error upper bound calculating circuitry adopts $\varepsilon_1+\varepsilon_2$ when the section $[x_0, b]$ is adopted as the predetermined section R as the upper bound of the error.

4. A non-transitory computer readable medium that stores a program for causing a computer to function as the approximate function calculation apparatus according to claim 1.

5. An approximate function calculation method, comprising:

when $x_0$ and $x_1$ represent predetermined numbers satisfying a relationship expressed as $x_0 < x_1$, $D = [x_0, x_1]$ represents a section in which a function $f(x)$ is to be approximated, $\varepsilon$ represents a predetermined number that is an error allowed in approximation, k represents a predetermined integer equal to or larger than 0, b represents a number satisfying a relationship expressed as $x_0 < b < x_1$, and a function $g_b(x)$ represents a Taylor expansion of the function $f(x)$ up to a k-th degree at b:

a Taylor expansion step in which Taylor expansion circuitry obtains the function $g_b(x)$;

a first error upper bound calculation step in which a first error upper bound calculating circuitry obtains an upper bound of an error of an approximation of the function $f(x)$ by the function $g_b(x)$ in a section $[x_0, b]$;

an expansion position calculation step in which expansion position calculating circuitry obtains an expansion position b' that represents a maximum b at which the upper bound of the error of the approximation of the function $f(x)$ by the function $g_b(x)$ in the section $[x_0, b]$ is equal to or smaller than $\varepsilon$ using the upper bound of the error obtained by processing by the first error upper bound calculating circuitry;

a second error upper bound calculation step in which second error upper bound calculating circuitry obtains an upper bound of an error of an approximation of the function $f(x)$ by a function $g_b'(x)$ in a section $[b', x_2]$, where $x_2$ represents a number satisfying $b' < x_2 \leq x_1$;

a right end position calculation step in which right end position calculating circuitry calculates a right end position $x_2'$ that represents a maximum $x_2$ at which the upper bound of the error of the approximation of the function $f(x)$ by the function $g_b'(x)$ in the section $[b', x_2]$ is equal to or smaller than $\varepsilon$ using the upper bound of the error obtained by processing by the second error upper bound calculating circuitry;

an output step in which output circuitry outputs information related to a section $[x_0, x_2']$ and the function $g_b'(x)$; and a control step in which control circuitry repeats processing of the Taylor expansion circuitry, the first and second error upper bound calculating circuitry, the expansion position calculating circuitry, the right end position calculating circuitry, and the output circuitry with a section $[x_2', x_1]$ as the section D.

*  *  *  *  *